United States Patent Office 3,257,328
Patented June 21, 1966

3,257,328
ORGANIC PHOSPHATES—STABILIZATION OF SILICA SOLS AND DISPERSIONS OR SUSPENSIONS OF SILICA AND SILICEOUS MATERIALS
Eric W. Vessey and Robert W. Linton, Springfield, Pa., assignors to Philadelphia Quartz Company, Philadelphia, Pa., a corporation of Pennsylvania
No Drawing. Filed Dec. 6, 1961, Ser. No. 157,565
2 Claims. (Cl. 252—313)

INTRODUCTION

This invention generally relates to novel compositions of matter containing combinations of siliceous materials and certain alkyl acid phosphates, and method for preparing and using these compositions.

BACKGROUND

The utilization of finely divided silica on a commercial scale is often difficult because finely divided silica usually either aggregates into relatively large particles in aqueous solution and thus is not available in the very finely dispersed state desired, or it forms highly viscous or unpumpable slurries at rather low concentrations of silica, such as 5 to 10% and/or forms a gel. It is also often difficult to even prepare a finely divided silica because of this tendency to aggregate during the course of its preparation so that the final product cannot be made available in the finely divided state which is desired.

Aqueous silica sols are also difficult to form at high concentration particularly in the presence of inorganic salts, and if inorganic salts are added to highly purified sols such sols become quite unstable. Furthermore, aqueous silica sols are notoriously easy to coagulate by chilling below 32° F.

OBJECTS

It is therefore an object of this invention to provide new methods for dispersing finely divided siliceous materials in liquid mediums. Another object of the invention is to provide a new method for inhibiting the aggregation or agglomeration of finely divided siliceous materials. Another objective of this invention is to produce usable fluid dispersions of siliceous materials which have greater stability and fluidity under a wide range of conditions. These, as well as other objects and advantages will become more apparent after considering the following more detailed disclosure.

THE PRESENT INVENTION

We have found that useful fluid dispersions of finely divided silica at high concentrations in aqueous solutions are possible by the addition of organic acid phosphates of simple structure, such as the alkyl acid orthophosphate esters.

We have now found that the addition of simple alkyl acid phosphate esters, either the orthophosphate or pyrophosphate, etc., will provide finely divided silica systems with a much higher degree of fluidity and in particular aqueous systems with a very high stability in the presence of inorganic salts or at freezing temperatures. Such stable dispersions restrict the aggregation of the finely divided silica even in very dilute solutions and indeed in the initial preparation of the finely divided silica the presence of these esters produces very highly separated finely divided particles. Dispersions of higher concentration and lower viscosity now become possible and indeed aggregated silica is more readily and quickly ground in the presence of such additives. Aqueous silica sols of high concentration may be frozen and thawed without difficulties. Similarly, high concentrations of inorganic salts may be added to such colloidal systems without their becoming unstable.

We believe that this invention is applicable to many different types of siliceous materials. It has been found especially helpful in purified silica sols and in slurries of hydrated and anhydrous silica such as Quso and Santocel, respectively. We believe that it also is applicable to metallic silicates, such as aluminum silicate, clays and calcium and magnesium silicate in aqueous systems. Thus the siliceous materials may be colloidal silica in the form of a sol or precipitated silica. Particle size ranges may run from colloidal sols, such as the Ludox sols manufactured by du Pont, or Syton sols manufactured by Monsanto Chemical Co., to finely divided silica such as Quso, a precipitated hydrated silica, or Hi-Sil manufactured by Pittsburgh Plate Glass Co., and anhydrous aerogels such as Santocel manufactured by Monsanto Chemical Co., or fumed silica or aerosils such as Cab-O-Sil manufactured by the Cabot Co., or the similar products of Dow Chemical Co. and Degussa. Finely divided pulverized xerogels, such as Syloids 978 and 404 manufactured by the Davison Chemical Co., and the calcium silicate, Silene, manufactured by Pittsburgh Plate Glass Co., as well as kaolin and other clays may also be dispersed more completely with these additives.

We have found the following compounds effective in aiding the initial dispersion of finely divided silicas and stabilizing them:

Ethyl acid phosphate
n-Butyl acid phosphate
Mono butyl acid orthophosphate
Amyl acid phosphate
Mono 2 ethylhexyl acid orthophosphate
Ethyl oleyl acid orthophosphate
Isoamyl octyl acid orthophosphate
Mono dibutyl acid orthophosphate
mono di-isoamyl acid orthophosphate
Di-isooctyl acid pyrophosphate The following are not effective:

Triethyl ammonium phosphate
Tributyl phosphate
Dibutylamine pyrophosphate (DP solution) sold by Monsanto Chemical Co.

A generalized formula for our useful compounds would be:

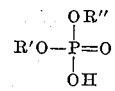

Where R′ is an alkyl group and preferably a straight chain alkyl group having 1–8 carbon atoms, and R″ is an alkyl group or hydrogen, and desirably a straight chain alkyl group having 1–18 carbon atoms or, more preferably, 1–8 carbon atoms.

Alternatively, a condensed phosphoric acid ester, such as a pyrophosphate, is useful. This would have the formula:

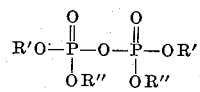

in which one of the R groups is H and the other R groups are alkyl groups and desirably straight chain alkyl groups having 1–18 carbon atoms or, more preferably, 1–8 carbon atoms.

The amount of the alkyl acid phosphate needed in order to accomplish the objectives of the invention is not critical and in all events is minor in relation to the major amounts of siliceous materials. The amount of the alkyl acid phosphate is preferably less than 10% of the weight of the silica present or 1 gram per 1000 square meters of silica surface.

The acid phosphate esters lower the viscosity of silica dispersions, maintain them with a minimum of settling and increase their stability under conditions of freezing and high salt content. They also make the initial dispersion easier and more complete. The solid substantially dry finely divided powders may be combined with these phosphate acid esters and then readily dispersed in water to form a stable slurry or sol, depending on the effective particle size. Although the solvent or continuous phase is preferably water, i.e., an aqueous system, we have found that these agents are also useful as milling aids and stabilizers in the original grinds for the preparation of nitrocellulose lacquers. Silicas so prepared will settle out to a much lesser extent and will be much more readily dispersed in the final lacquer system.

It will be readily apparent to those skilled in the art that the findings of this invention will be of advantage in the mill dispersion of finely divided silicas for coatings and paints, i.e., in these systems the acid phosphate esters are grinding aids. The acid phosphate esters also produce stable aqueous sols of $SiO_2$ and high concentration dispersions of finely divided silica powders. These stable fluid slurries at high concentration are useful as additives in paint and lacquer systems and in the preparation of anti-slip and anti-soil materials in the textile and cleaning industries. Another useful application is in the dispersion of finely divided silica at high dilution for use in particle counting techniques as exemplified by the Coulter Counter.

THE EXAMPLES

There are a number of different materials referred to in the following examples and it is believed worthwhile to more specifically define them, as follows:

Sodium silicate "N," sold by the Philadelphia Quartz Co., has a ratio by weight of 3.22 $SiO_2$:$Na_2O$ and 8.9% $Na_2O$.

Triton X-100 is a non-ionic surface active agent described as isooctyl phenyl polyethoxy ethanol and sold by Rohm & Haas Co.

Santocel FRC, sold by Monsanto Chemical Co., has the following properties:

| | |
|---|---|
| $SiO_2$, percent | 97.2 |
| Ignited loss, percent | 3.5 |
| $Na_2SO_4$, percent | 0.3 |
| pH | 3.7 |
| Area (BET), m.$^2$/g. | 260 |
| Particle size, $\mu$ | 0.4–5 |
| Oil absorption, g./100 g. | 380 |
| Bulk density, lbs./ft.$^3$ | 6 |

Quso F 20 and Quso G 30, are precipitated hydrated silicas sold by the Philadelphia Quartz Co., having the following properties:

| | Quso F 20 | Quso G 30 |
|---|---|---|
| $SiO_2$ (anhydrous basis), percent | 97.5 | 97 |
| Loss on ignition, percent | 10.6 | 12.2 |
| Loss at 105° C., percent | 5.3 | 7.0 |
| HF residue, percent | 2.3 | 3.2 |
| Particle size, $\mu$ | 12 | 12 |
| pH | 6.4 | 8.2 |
| $Na_2O$ (titratable with methyl orange), percent | 0.3 | 1.0 |
| Surface area (BET), m.$^2$/g | 300 | 270 |
| Oil absorption, g./100 g | 220 | 205 |
| Refractive index | 1.44 | |
| Bulk density, lbs./ft$^3$ | 10 | |

Lacquer A solids had the following composition:

| | Percent |
|---|---|
| Regular solubility, ½ second nitrocellulose (as 70% solids in ethyl alcohol), from Hercules Powder Co. | 35.0 |
| Duraplex ND-78 (as 60% solution in xylene) from Rohm & Haas Co. | 25.0 |
| Amberol 801-XLT, 100% solids, from Rohm & Haas Co. | 25.0 |
| Paraplex 5-B, 100% solids, from Rohm & Haas Co. | 7.5 |
| Di-butylphthalate | 7.5 |

Lacquer A solution had the following composition:

| | Percent |
|---|---|
| ½ sec. R.S. nitrocellulose solids | 9.65 |
| Amberol 801-XLT solids | 6.89 |
| Paraplex 5-B solids | 2.07 |
| Duraplex ND-78 solids | 6.88 |
| Di-butylphthalate | 2.07 |
| Toluol | 26.34 |
| Butyl acetate | 16.53 |
| Ethyl alcohol | 4.13 |
| Ethyl acetate | 8.29 |
| Butyl alcohol | 12.56 |
| Xylene | 4.59 |

Mixed solvent contains:

| | Percent |
|---|---|
| N-butyl acetate | 20 |
| Ethyl acetate | 10 |
| Butanol | 15 |
| Ethanol | 5 |
| Toluol | 50 |

Ludox-LS, sold by Du Pont de Nemours Co., is an aqueous sol containing 30% of $SiO_2$ and has a ratio of $SiO_2$:$Na_2O$ of 285. It has a viscosity of 13 cps. and a pH of 8.4, the particle diameter is said to be 15 mu and the area (BET) is 210 m.$^2$/g.

Syloid 244 sold by the Davison Chemical Co. of Baltimore, Md., is an aerogel and has the following properties:

| | |
|---|---|
| Loss on ignition, percent | 6.5 |
| pH (5% slurry in water) | 7.0 |
| $SiO_2$ (ignited basis), percent | 99.3 |
| Surface area, m.$^2$/g. | 300. |
| Particle size, $\mu$ | 3.3 |

Silicone oils are dimethyl silicone fluids having the generalized formula:

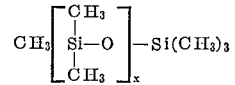

The polymer molecules terminate in unreactive units creating a stable fluid of predetermined and unchanging viscosity. The silicone oil mentioned in the examples was GESF-69 silicone oil from the General Electric Co. having special utility as an anti-flood and anti-float agent in surface coatings. SF-69 silicone oil has a nominal viscosity at 25° C. of 25 centistokes, a specific gravity at 25/25° C. of 0.960, and a flash point of 135° F. It will lose 60% of its weight when heated for 24 hours at 150° C. and have a refractive index at 25° C. using a sodium D line of 1.3989.

*Example 1*

A slurry of finely divided silica gel was prepared by vigorously agitating sodium silicate "N" with a solution of 61 parts of $NH_3$ per hundred parts of $SiO_2$ and 230 parts of $CO_2$ per hundred parts of $Na_2O$. The final slurry contained 4.5% $SiO_2$ was too thick to flow. However, a pumpable, thixotropic slurry was produced by the addition of between 4 and 5 ml. (i.e., less than 1% by weight) of mono-di-butyl acid orthophosphate to 500 ml. of slurry. This illustrates the dispersing properties of the compounds of the invention.

*Example 2*

The dispersing effects of the compounds of this invention can also be demonstrated by the use of particle counting devices which are now commercially available. For example, the Coulter Counter, sold by Coulter Electronics, Inc., Chicago, Illinois, operates on the principle of suspending material in a conducting liquid, pumping it through an orifice of regulated size, and measuring the number of particles in the liquid which passed through the orifice. Each particle passing through the orifice interferes with the current between electrodes placed on opposite sides of the passage and this change in conductivity is measured and counted by the instrument. The instrument not only measures the number of particles but also their relative volume. The threshold strength of the field can be adjusted to measure particles of different sizes. The operation of this counter can be found in an article in the ASTM Symposium on Particle Size Measurement, Special Techn. Publn. 234 (1958), and also Analytical Chem., 32, 1162 (August 1960).

With systems of hydrated silica, re-aggregation and reagglomeration occurs even after vigorous dispersion such as occurs with a Waring Blendor. Analysis of particle size distribution is thus difficult to interpret. As re-agglomeration takes place, the precentage of either single particles or aggregates of particles which can be counted with a given aperture increases and approaches 100% of silica present in the system. Therefore, these systems are extremely sensitive to dispersants. Quite dilute dispersions are used in aqueous systems containing some univalent satl. The mono-di-butyl acid orthophosphate is the most effective dispersant for silica that we have so far found.

In such a test 28–30 p.p.m. of $SiO_2$ was dispersed in an aqueous 1% NaCl solution and blended for 15 seconds with a Waring Blendor. The counting was done using a hundred micron aperture in the Coulter Counter. The following table shows that the addition of the mono-dibutyl acid orthophosphate inhibited re-aggregation at low stirring speeds. The percentage figures represent the proportion of the silica counted.

| Stirring speed | No additive, percent | Triton X 100, percent | Mono-dibutyl acid orthophosphate, percent |
|---|---|---|---|
| <800 r.p.m. | 50–85 | 75 | <50 |

*Example 3*

An aqueous paste of 16.7% of hydrated precipitated Quso F 20 silica is quite stiff and can be cut with a spatula without crumbling. The addition of 1.3% (based on the $SiO_2$ content) of mono-di-butyl acid orthophosphate to such a dispersion of finely divided hydrated precipitated silica produced a thick, creamy slurry, while the addition of 3.3%, also based on the $SiO_2$ content (or 0.5% of the total slurry) produced a very fluid, milk-like slurry. This is about 1 gram per 1000 square meters of silica surface.

*Example 4*

100 ml. of Ludox–LS were mixed with 10 to 20 ml. of the materials listed in the table below using a high-speed agitator and the product was allowed to age 1 month. In most cases 2 layers formed with silica in the aqueous phase. It was assumed that the silica absorbed the maximum amount of the added material possible and the remainder formed the second layer.

10 ml. portions of the silica layer were mixed with 10 ml. of a brine (20% NaCl) solution and an observation of stability was made before and after chilling for 1.75 hours at −20° C. and standing 11 days. Other 10 ml. portions were also observed before and after chilling but without the addition of the brine solution. It will be seen that the acid phosphates stabilized the sols against gelling or precipitation, whereas the other phosphates failed by permitting either gelling or precipitation under some conditions. The long chain oleyl group (in Sol No. 10) formed a reaction product which may be a water soluble gel and was unaffected by the various treatments and remained readily dispersible on dilution. The treated sols, such as these, have remained stable for at least four months.

| Sol No. | Additive | Untreated | | Brine treated | |
|---|---|---|---|---|---|
| | | Before Chilling | After Chilling | Before Chilling | After Chilling |
| 0 | None | Light haze | Solids pptd | Gelled | Gelled. |
| 5 | Mono-dibutyl acid orthophosphate | Bluish haze | Bluish haze | Deep haze | Bluish haze. |
| 8 | Monobutyl acid orthophosphate | do | do | do | Do. |
| 9 | Mono-di-isoamyl acid orthophosphate | do | do | do | Do. |
| 10 | Ethyl oleyl acid orthophosphate | White, opaque, fluid. | White, fluid.[1] | White, opaque, fluid. | White, fluid.[1] |
| 11 | Mono-2-ethylhexyl acid orthophosphate | Bluish haze | Bluish haze | Bluish haze | Bluish haze. |
| 12 | Di-isooctyl acid pyrophosphate | do | do | Deep haze | Do. |
| 13 | Ethyl acid phosphate | do | do | Bluish haze | Do. |
| 14 | Amyl acid phosphate | do | do | Deep haze | Do. |
| 16 | Isoamyl-octyl acid orthophosphate | do | do | Bluish haze | Do. |

[1] Probably due to oleyl groups which tend to form a non-siliceous gel which dissolves when diluted.

*Example 5A*

In the formulation of lacquers flatted with silica it is desirable to introduce more than 12% of silica in the mill base so as to increase the rate of producing lacquer. While this is not difficult with substantially anhydrous gels of larger particle size such as Syloid 244, or Santocel FRC, the precipitated hydrated silicas thicken the mill base at low concentration and it is possible to introduce only about 8% $SiO_2$ in this way. Numerous additives known to have dispersing properties have been tested but only the acid phosphate esters have been found to lower the viscosity sufficiently to permit the introduction of concentrations of about 15% $SiO_2$ (in the form of hydrated precipitated silica). The acid phosphate esters not only give a great reduction in viscosity of the mill base but they are the only additives we have found which do not allow the silica to settle out to a hard layer on standing. Other additives such as quaternary ammonium salts and amines will lower the viscosity but result in a poor suspension in discolored lacquer at higher cost.

A grind was prepared with 5 parts of lacquer A solids, 10 parts of Quso F 20, 85 parts of mixed solvent and 0.26 part of mono-dibutyl acid orthophosphate (less than 1 gram per 1000 square meters of surface area). This mixture, without the orthophosphate, had a high yield point and rapid set. With the orthophosphate present, the grind poured freely from the mill and gelation was very slow. The silica did not settle. The grind was diluted with lacquer and lacquer solvent to 20% solids, of which 3% was SiO$_2$, and was found to have a flatting efficiency equivalent to films without the additive. In other words, the addition of the additive did not reduce the flatting efficiency.

*Example 5B*

A precipitated hydrated silica having the following composition:

| | |
|---|---|
| SiO$_2$, percent | 89.8 |
| Ignited loss, percent | 9.4 |
| Loss at 105° C., percent | 5.2 |
| Na$_2$O titratable, percent | 0.25 |
| HF residue, percent | 0.54 |
| pH | 7.6 |
| Area m.$^2$/g. | 104 |
| Oil absorption g./100 g. | 169 |
| Bulk density lbs./ft.$^3$ | 2.8 |
| Particle size, mu | 15 | when used in a grind composition of 9% SiO$_2$, 6.0% lacquer A solids, and 0.02% silicone oil had a pregrind viscosity of 93 KU (Krebs units) with a high yield value, whereas after adding 1% (10% by weight based on the SiO$_2$) mono-dibutyl acid orthophosphate, the viscosity was 61 KU and the yield value was low. (Krebs units are empirical units determined with a Krebs viscometer.) This is about 1 gram of phosphate ester to 1000 square meters of silica surface.

*Example 5C*

A mill base for a lacquer was prepared with 15% of a hydrated precipitated silica, Quso F 20 and 5% of lacquer A solids in a lacquer A solution.

Each of the examples in the following table was prepared by the addition of 10% of the phosphate ester based on the SiO$_2$ content. The phosphate ester was an added component of the above mill base before mixing. If the additive reduced the final viscosity enough so that the slurry could be poured, the additive was considered effective (i.e., "yes," in table). This is about 1 gram of phosphate ester per 3000 square meters of silica surface.

PHOSPHATE ESTERS SCREENED IN LACQUER A SLURRY OF 15% SILICA, 5% LACQUER A SOLIDS

| Additive | Conc.,[1] percent | Method [2] | Silica | Effective [3] |
|---|---|---|---|---|
| Triethylammonium phosphate | 10.0 | A | Quso F 20 | No. |
| Tributyl phosphate | 22.0 | A | do | No. |
| Di-butylamine pyrophosphate (DD Solution) | 10.0 | A | do | No, perhaps slightly. |
| Ethyl acid phosphate | 10.0 | A | do | Yes. |
| n-Butyl acid phosphate | 10.0 | A | do | Yes. |
| Mono-butyl acid orthophosphate | 10.0 | A | do | Yes. |
| Amyl acid phosphate | 10.0 | A | do | Yes. |
| Mono-2-ethylhexyl acid orthophosphate | 10.0 | A | do | Yes. |
| Ethyl oleyl acid orthophosphate | 10.0 | A | do | Yes. |
| Iso-amyl-octyl acid orthophosphate | 10.0 | A | do | Yes. |
| Mono-dibutyl acid orthophosphate | 10.0 | A | do | Yes. |
| Mono-di-iso-amyl acid orthophosphate | 10.0 | A | do | Yes. |
| Di-isooctyl pyrophosphate | 10.0 | A | do | Very. |
| Mono-dibutyl acid orthophosphate | 34.5 | B | Santocel FRC | Yes. 72-54 KU. |
| Do | 10.0 | B | do | Yes. 106-55 KU. |
| Do | 10.0 | B | Quso F 20 | Yes. 71-72 KU. |
| Di-butylamine Pyrophosphate | 22.0 | B | do | No. 115 KU-X. |
| Do | 10.0 | B | do | No. 114 KU-X. |
| No additive (12% SiO$_2$) | | B | do | No. 102 KU-X. |

[1] Concentration based on silica.
[2] Method A, addition of phosphate to a lacquer-silica slurry with stirring. Method B, addition of phosphate to slurry and ball milling.
[3] Figures represent pre and post grind viscosities. X means not removable from mill.

The two tests in the above table with anhydrous silica (Santocel FRC) were mixed by a ball mill and showed a large reduction in viscosity after ball milling compared to the initial viscosity. With Quso F 20, mere stirring was effective so that ball milling did not make any difference in the viscosity of the grind, although the grind without additive was too stiff to use.

*Example 5D*

In these tests Quso F 20 and Quso G 30 were mixed in the following 2 quart formulations with the lacquer A solids and solvents of Example 5C plus 1 part per 5000 silicone oil. The mixes were stirred with a high-speed stirrer and monodibutyl orthophosphate from Victor Chemical Co. was added drop-wise. With the Quso F 20 an endpoint was reached at which viscosity dropped sharply. With Quso G 30 the endpoint was not so sharp. The amount shown in the table below is the amount of orthophosphate needed to reach the endpoint. This amount appears to depend on the total silica surface available for absorption of phosphate.

| | 1 | 2 | 3 | 4 | 5 | 6 |
|---|---|---|---|---|---|---|
| Quso F 20, percent | 8 | 12 | 15 | | | 12 |
| Quso G 30, percent | | | | 10 | 15 | |
| Lacquer solids, percent | 5 | 8 | 5 | 10 | 5 | 8 |
| Mono-dibutyl orthophosphate, percent | 0.0 | 0.6 | 1.3 | 0.8 | 1.9 | 0.0 |
| Pre-grind viscosity KU | 52 | 54 | 72 | 62 | ([1]) | 102 |
| Post-grind viscosity, KU | 53 | 53 | 62 | 53 | 53 | ([2]) |

[1] Too thick.
[2] Too thick to measure.

*Example 6*

Three samples of Quso F 20 were tested in 2 quart grinds. Sample A had been reductionized after treatment with 9% of mono-dibutyl orthophosphate. The untreated portion (B) was also reductionized. One part of (B) was then tested with 9% of the same orthophosphate (C).

| Composition (parts by weight) | Treated | Untreated | B+phosphate |
|---|---|---|---|
| SiO$_2$ | 14.3 | 8 | 15 |
| Lacquer a Solids | 5 | 5 | 5 |
| Mixed Solvent | 80 | 87 | 85 |
| Silicone Oil GESF-69 | .0002 | .0002 | .0002 |
| Mono-dibutyl acid orthophosphate | 1.3 | 0 | 1.3 |
| Mix appearance | ([1]) | ([2]) | ([3]) |
| Viscosity pregrind, KU | 73 | 77 | ([3]) |
| Viscosity postgrind, KU | 62 | 63 | 55 |
| Time to Hegeman 5.5, hrs. | 2 | 2 | 4 |
| Ease of discharge | ([4]) | ([5]) | ([6]) |

[1] Fluid.
[2] Gel.
[3] Very thick.
[4] Good.
[5] Very hard to pour.
[6] Slight shaking required.

*Example 7*

A Cowles laboratory disperser with a stainless steel beaker 9 inches in diameter and a 3 inch blade rotating at 4200 r.p.m. for 3 minutes and for 12 minutes more at 3000 r.p.m. was used to disperse silica Quso F 20 in lacquer A solution. The mixture was 2400 parts of lacquer A solution containing 25% solids, 72 parts of Quso F 20 and 2 parts of mono-dibutyl orthophosphate. Following this, 249 parts additional of Quso F 20 were added and 14.9 parts of the orthophosphate in 10 minutes at 2800 r.p.m. This equaled 0.73% of the orthophosphate. Speed was then increased to 6000 r.p.m. for 5 minutes and set back to 5400 r.p.m. for 10 minutes. The mixture stirred with a good roll and was fluid. On cooling from 50° C. the mixture set to a thick paste containing 59.6% of solvent, 13.8% of silica and 25.8% of lacquer A solids with 0.8% of the orthophosphate. The fineness of grind was 5.5 Hegeman (0.0017 inch). Without the phosphate ester, such a mixture with 13% Quso F 20 would be stiff and non-fluid and, therefore, would not develop a good roll.

Those skilled in the chemical arts, and particularly in the art to which this invention pertains, will readily appreciate that many modifications of the basic invention set forth here are possible. For example, it is qute possible that other closely related compounds might work as well as the herein specifically described compounds and there would certainly be no invention involved in trying such closely related compounds, in view of the present broad disclosure. All of these modifications are considered to be within the scope of the present claims by virtue of the well-established "doctrine of equivalents."

What is claimed is:

1. A novel composition of matter consisting essentially of:
   (a) a hydrated precipitated silica,
   (b) mono-di-butyl acid orthophosphate, and
   (c) water as a dispersion medium for said silica and said orthophosphate,
   (d) said silica being about 16.7% by weight of said composition, said orthophosphate being about 3.3% by weight of said composition, and said water being the remainder of said composition.

2. A novel composition of matter consisting essentially of:
   (a) a silica sol, and
   (b) an organic phosphorous compound selected from the group consisting of those compounds having the formula:

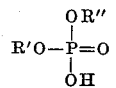

and

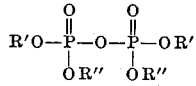

wherein:
   R' is a straight chain alkyl group having 1–8 carbon atoms; and
   R" is selected from the group consisting of hydrogen and straight chain alkyl groups having 1–8 carbon atoms,
   said phosphorous compound being less than 10% by weight of said silica sol.

References Cited by the Examiner

UNITED STATES PATENTS 2,524,357  10/1950  Robey _____ 252—309 XR

ALBERT T. MEYERS, *Primary Examiner.*

JULIUS GREENWALD, *Examiner.*

R. D. LOVERING, *Assistant Examiner.*